United States Patent

[11] 3,604,446

[72] Inventor Glenn R. Brooks
   Fallbrook, Calif.
[21] Appl. No. 827,745
[22] Filed May 26, 1969
[45] Patented Sept. 14, 1971
[73] Assignee The Garrett Corporation
   Los Angeles, Calif.

[54] VALVE
   4 Claims, 1 Drawing Fig.
[52] U.S. Cl. .................................................. 137/115,
   137/119, 137/491, 137/512.2
[51] Int. Cl. ..................................................... F16k 17/10
[50] Field of Search .......................................... 137/115,
   614.17, 614.18, 512.2, 512.3, 119, 491, 108

[56] References Cited
UNITED STATES PATENTS

| | | | |
|---|---|---|---|
| 2,150,266 | 3/1939 | Cotner ............................ | 137/491 |
| 3,358,705 | 12/1967 | Krechel .......................... | 137/119 |
| 3,402,734 | 9/1968 | Robbins ......................... | 137/491 |

*Primary Examiner*—Laverne D. Geiger
*Assistant Examiner*—William A. Wright
*Attorneys*—Dominick Nardelli and John N. Hazelwood

ABSTRACT: A fluid valve having an internal bypass orifice and a spring biased piston to which the fluid pressure is applied. When the pressure is above a given value, the piston moves compressing the spring, first cutting off the flow through the bypass orifice and afterwards opening the valve port to channel the fluid to a place of use.

PATENTED SEP 14 1971
3,604,446
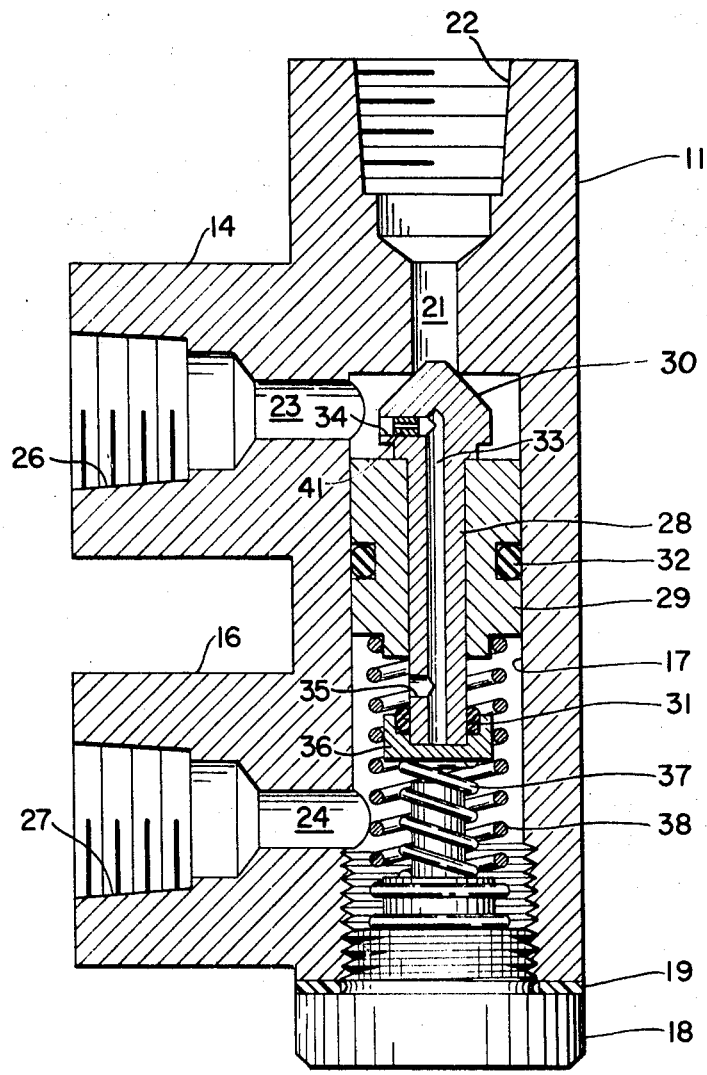
INVENTOR.
GLENN R. BROOKS
BY Dominich Nardelli
ATTORNEY

VALVE

The invention relates to valves and more particularly to fuel valves for gas turbines.

In the past, whenever gas turbines using liquid fuels are started, flames generally are observed leaving the exhaust nozzles, because the fuel nozzles cannot effectively vaporize liquid fuel during startup when pressure is low. Until now, gas turbines have used valves operated by various means, e.g., a valve which opens when the no-flow static head and turbine speed are above a minimum value. The means which opens the valve does not compensate for changes in ambient conditions and normal wear that normally affect the static head after the valve opens, preventing satisfactory atomization of the fuel. Fuel, that flows into the combustion chamber before light-off or is not atomized, continues burning as it enters the turbine section and exhaust nozzle. This condition causes excessive temperature, loss of efficiency and power and is a fire hazard.

Therefore, an object of this invention is to provide an improved valve for an engine fuel system.

Another object of this invention is to provide a valve which does not open until a minimum pressure at the desired flow rate is obtained at the valve inlet.

These and other objects and features of advantages will be further understood by reference to the following specifications and the drawing wherein the sole FIGURE is an axial section of the novel valve.

DESCRIPTION OF THE VALVE

Referring to the drawing, the valve has a cylindrical body 11, which has two radially protruding appendages, an inlet appendage 14 and a return appendage 16. The body 11 and appendages 14 and 16 are made preferably of a noncorrosive metal. The body 11 has an axially disposed cylindrical bore 17 extending inward from the lower end thereof, as viewed in the drawing. On the outer end of the bore 17 are formed threads 20 which are engaged by a plug 18. A suitable seal 19 is disposed between the body 11 and plug 18. At the inner end of the bore 17, an axially aligned passageway 21, having a substantially smaller diameter than bore 17, extends therefrom to form an outlet port. Suitable threads 22 are provided on the outer end of passageway 21 so that tubing (not shown) can be connected thereto. Extending radially from bore 17 and within appendages 14 and 16, respectively, are additional passageways 23 and 24 with suitable threads 26 and 27, formed on the outer ends thereof, so that more tubing (not shown) can be connected thereto. Passageway 23 forms an inlet port while passageway 24 forms a return port.

Within bore 17 are disposed coaxially a valve plunger 28 and a valve piston 29, wherein the plunger 28 protrudes through an axial opening formed in the piston 29. The valve plunger 28 has a conical end 30 which seats against the valve port formed by the shoulder formed between bore 17 and passageway 21. The valve piston 29 is disposed to slide axially within bore 17, and in turn, the valve plunger 28 is disposed to slide axially with respect to the piston 29. A suitable seal 32 is disposed between piston 29 and body 11. The plunger 28 has a fluid passageway, a portion of which is formed by, for example, drilling an axial hole 33 from the end opposite the conical end 30, and other portions of which are formed by drilling radially directed holes 34 and 35. Hole 34 encloses a suitable orifice 41 for reasons that will hereinafter be explained. The axial open end of hole 33 is closed with a cap 36 which supports a suitable O-ring seal 31 for reasons that will be explained hereinafter. Against the opposite end of the cap 36 seats one end of a compression spring 37, while the other end seats against the plug 18. The spring 37, being a compression spring, urges the conical end 30 against the valve port. Around spring 37 is disposed another compression spring 38 which pushes piston 29 away from plug 18 against the enlarged conical end 30 of the valve plunger, as shown in the figure.

THE OPERATION OF THE VALVE

When fuel from a suitable pump is connected to inlet appendage 14, the fuel initially flows through inlet passageway 23, holes 34, 33 and 35 and orifice 41 into bore 17, and out through return passageway 24 to be returned to the supply tank, the pump inlet, overboard drain, or elsewhere, as appropriate. As the pump increases the fuel pressure and flow rate, a pressure builds up within passageway 23, because the function of orifice 41 is to restrict the flow. When the pressure rises sufficiently, piston 29 is pushed towards the plug 18 compressing spring 38. When piston 29 moves a relatively short distance, the hole 35 is covered by the piston cutting off the flow of fuel through the plunger 28. The fuel pressure further acts on the piston 29 causing the piston to contact the seal 31 on cap 36 ensuring that all the bypass flow is completely stopped. The resulting pressure is sufficient to force the conical end 30 on the plunger 28 from the shoulder forming the valve port. The fuel now spurts through passageway 21 to the gas turbine. Since the fuel within the passageway is at full flow and full pressure, the fuel is vaporized effectively within the fuel nozzle and light-off can occur promptly after the valve opens preventing any flooding within the combustor. Orifice 41 is sized to match the flow characteristics of the primary or start fuel nozzle in the respective turbines and spring 38 is matched to produce the pressure required to effectively atomize the particular fuel used by the turbine. Preferably orifice 41 is disposed to be easily removed so that the same designed valve can be made to fit many gas turbines.

The preferred specific embodiment of the invention has been described, but the invention is not limited to the exact details of this embodiment, but includes all other modifications and variations coming within the scope of the claims.

What is claimed is:

1. In a fluid supply system, a valve comprising:

a housing having an inlet port, an outlet port, and a return port;

first means for normally closing the passageway from said inlet port to said outlet port when the pressure of the fluid at the inlet port is below a given value;

second means, including a metering means for making the fluid flow rate to said return port a function of the fluid pressure, for bypassing the fluid from said inlet port to said return port when said pressure is below said given value; and third means activated by the fluid pressure when the fluid pressure is above the given value for stopping the bypassing of fluid from said inlet port to said return port and for activating said first means to open the passageway between the inlet and outlet ports.

2. In the system of claim 1 wherein:

said housing is provided with a cylindrical bore having one end closed and one end open with said ports communicating therewith;

said outlet port being disposed at the closed end of said bore, said third means includes:

a valve piston slidably disposed within said bore, and said piston having an axial opening;

said first means includes:

a valve plunger slidably disposed within said axial opening, a plug covering the open end of said bore, and a spring reacting between said piston and said plug for urging said piston against said plunger and said plunger against said outlet port, said inlet port is disposed at one end of the piston and the return port is disposed at the opposite end; and said valve plunger has a second passageway communicating one end of the piston with the other end to form said second means, the openings of said second passageway being disposed so that both are open when said spring urges said plunger against said outlet port and being disposed so that at least one opening is closed when the fluid pressure at said inlet port causes said piston to move against the action of said spring.

3. In the system of claim 2 wherein:
another spring is disposed for action between said plunger and said plug to aid the urging of said plunger against said outlet port.

4. In the system of claims 2 or 4 wherein:
an orifice is provided within said second passageway to control the flow rate therethrough.